United States Patent [19]

Carreira et al.

[11] Patent Number: 5,220,346
[45] Date of Patent: Jun. 15, 1993

[54] PRINTING PROCESSES WITH MICROWAVE DRYING

[75] Inventors: Leonard M. Carreira; Arthur M. Gooray; Kenneth C. Peter, all of Penfield; Louis V. Isganitis, Rochester; Edward J. Radigan, Hamlin, all of N.Y.

[73] Assignee: Xerox Corporation, Stamford, Conn.

[21] Appl. No.: 830,163

[22] Filed: Feb. 3, 1992

[51] Int. Cl.$^5$ ............................................. B41J 2/05
[52] U.S. Cl. .................................. 346/1.1; 106/22 R; 101/488; 219/216; 346/25; 346/140 R
[58] Field of Search ............... 346/1.1, 25, 75, 140 R; 106/22; 101/424.1, 488; 219/216

[56] References Cited

U.S. PATENT DOCUMENTS

| | | | |
|---|---|---|---|
| 3,994,736 | 11/1976 | Hertz et al. | 106/22 |
| 4,070,322 | 1/1978 | Hwang et al. | 260/29.6 R |
| 4,142,905 | 3/1979 | Cooke | 106/22 |
| 4,197,135 | 4/1980 | Bailey | 106/22 X |
| 4,256,493 | 3/1981 | Yokoyama et al. | 106/22 |
| 4,327,174 | 4/1982 | Von Meer | 430/530 |
| 4,381,946 | 5/1983 | Uehara | 106/22 |
| 4,395,287 | 7/1983 | Kobayashi | 106/22 |
| 4,469,026 | 9/1984 | Irwin | 101/484 |
| 4,482,239 | 11/1984 | Hosono | 219/216 X |
| 4,585,484 | 4/1986 | Haruta | 106/22 |
| 4,839,142 | 1/1989 | Charm | 422/21 |

FOREIGN PATENT DOCUMENTS 107490 8/1980 Japan .

Primary Examiner—Joseph W. Hartary
Attorney, Agent, or Firm—Judith L. Byorick

[57] ABSTRACT

Disclosed is a printing process which comprises applying in imagewise fashion to a substrate an ink composition which comprises an aqueous liquid vehicle, a colorant, and an ionic compound at least partially ionizable in the liquid vehicle, said ink composition having a conductivity of at least about 10 milliSiemens per centimeter, and subsequently exposing the substrate to microwave radiation, thereby drying the images on the substrate. A specific embodiment of the invention is directed to a thermal ink jet printing process which comprises (1) incorporating into a thermal ink jet printing apparatus an ink composition which comprises an aqueous liquid vehicle, a colorant, and an ionic compound at least partially ionizable in the liquid vehicle, said ink composition having a conductivity of at least about 10 milliSiemens per centimeter; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

37 Claims, 9 Drawing Sheets

PRINTING PROCESSES WITH MICROWAVE DRYING

BACKGROUND OF THE INVENTION

The present invention is directed to printing processes employing microwave image drying techniques. More specifically, the present invention is directed to printing processes which comprise applying in imagewise fashion to a substrate an ink composition which comprises an aqueous liquid vehicle, a colorant, and an ionic compound at least partially ionizable in the liquid vehicle, said ink composition having a conductivity of at least about 10 milliSiemens per centimeter, and subsequently exposing the substrate to microwave radiation, thereby drying the images on the substrate. Any printing process suitable for use with aqueous-based inks can be employed. A preferred embodiment of the present invention is directed to ink jet printing processes using specific ink compositions and employing microwave drying of the printed images. One specific embodiment of the present invention is directed to a thermal ink jet printing process which comprises (1) incorporating into a thermal ink jet printing apparatus an ink composition which comprises an aqueous liquid vehicle, a colorant, and an ionic compound at least partially ionizable in the liquid vehicle, said ink composition having a conductivity of at least about 10 milliSiemens per centimeter; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality prints or images. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. Nos. 4,601,777, 4,251,824, 4,410,899, 4,412,224, and 4,532,530, the disclosures of each of which are totally incorporated herein by reference.

Inks for ink jet printing processes are known. For example, U.S. Pat. No. 3,994,736 (Hertz et al.) discloses a pigment-free high intensity light fast ink suitable for ink jet printing which comprises a polar solvent liquid base and a premetallized azo dye. The ink can also contain an inorganic ionizable salt to impart electrical conductivity. Examples of salts include those with a chloride or nitrate anion and an alkali metal cation or ammonium cation In addition, U.S. Pat. No. 4,142,905 (Cooke) discloses a waterless ink for non-impact jet printers which comprises an ethylene glycol vehicle, an inorganic salt such as sodium nitrite, sodium nitrate, or sodium chloride dissolved in the glycol to provide a required level of electrical conductivity, and a dye. Further, U.S. Pat. No. 4,070,322 (Hwang et al.) discloses an ink composition for jet printing onto non-absorbent surfaces based on a ketone solvent having a soluble ionizable salt and a dyestuff. In addition, the ink can contain water in an amount of up to 10 percent by weight, a lower alcohol in an amount of up to 8 percent by weight, a pyrrolidone in an amount of up to 4 percent by weight, and a vinyl acetate copolymer resinous binder in an amount of up to 6 percent by weight. The ink has a viscosity of 1.5 to 10 centipoise, a resistance of less than 2,000 ohm-cm, a surface tension of less than 28 dynes per centimeter, a velocity of sound within the range of 1,200 to 1,700 meters per second, and an upper limit of 5 microns insolubles. Examples of soluble ionizable salts include the alkali metal and alkaline earth metal halides, ammonium nitrate, and alkali metal thiocyanates, alkali metal alkylates. Additionally, U.S. Pat. No. 4,256,493 (Yokoyama et al.) discloses a jet ink composition which comprises an aqueous jet ink containing a water-soluble dye, a wetting agent, and water as main components and, incorporated therein, a water-soluble ultraviolet absorbing agent as well as a metal salt, when necessary. The metal salt component is capable of improving the light-resistance of the ink.

U.S. Pat. No. 4,839,142 (Charm), the disclosure of which is totally incorporated herein by reference, discloses a high temperature, short time heating system and method for the pasteurization and/or sterilization of heat sensitive biological fluids which comprises adding a dielectric enhancing additive to the biological fluid, subjecting the biological fluid to microwave energy to heat rapidly the biological fluid for a short time period to a pasteurizing or sterilization temperature, cooling the biological fluid, optionally removing the dielectric enhancing additive, and recovering an aseptic biological fluid. Examples of dielectric enhancing additives include inorganic metal or ionic salts, such as alkali or alkaline earth salts, such as sodium chloride.

U.S. Pat. No. 4,327,174 (von Meer), the disclosure of which is totally incorporated herein by reference, discloses a carrier material for photographic purposes which is formed of paper coated with a synthetic resin. The paper contains a water soluble inorganic salt that enhances its drying by microwaves. Examples of soluble inorganic salts include $KCl$, $NaCl$, $Na_2SO_4$, $NaBr$, $KBr$, $MgCl_2$, $MgSO_4$, $CaCl_2$, $ZnCl_2$, $LiCl$, and $K_2SO_4$.

Copending application U.S. Ser. No. 07/829,863, filed Feb. 3, 1992 the disclosure of which is totally incorporated herein by reference, discloses printing processes which comprise incorporating into an ink jet printing apparatus an ink composition which comprises an aqueous liquid vehicle, a colorant, and a zwitterionic or potentially zwitterionic component such as 4-aminobutyric acid, 6-aminocaproic acid, L-proline, and the like as well as mixtures thereof; (2) causing droplets of the ink to be ejected in an imagewise pattern onto a substrate, thereby generating images on the substrate; and (3) exposing the substrate to microwave radiation, thereby drying the images on the substrate.

Although known compositions and processes are suitable for their intended purposes, a need remains for ink jet printing processes with rapid output times. In addition, there is a need for ink jet printing processes employing microwave drying of the images. Further, there is a need for thermal ink jet printing processes that enable output speeds of at least 10 prints per minute, as well as slower output speeds. There is also a need for ink jet printing processes employing microwave drying wherein the microwave drying apparatus has reduced power requirements. Further, a need exists for thermal ink jet printing processes with fast image drying times and with reduced paper cockle. In addition, there is a need for printing processes for which aqueous-based inks are suitable and which employ microwave drying of the printed images. There is also a need for thermal ink jet printing processes employing microwave drying of the images which enable good print quality and minimal showthrough and strikethrough.

SUMMARY OF THE INVENTION

It is an object of the present invention to provide ink jet printing processes with rapid output times.

It is another object of the present invention to provide ink jet printing processes employing microwave drying of the images.

It is yet another object of the present invention to provide thermal ink jet printing processes that enable output speeds of at least 10 prints per minute, as well as slower output speeds.

It is still another object of the present invention to provide ink jet printing processes employing microwave drying wherein the microwave drying apparatus has reduced power requirements.

Another object of the present invention is to provide thermal ink jet printing processes with fast image drying times and with reduced paper cockle.

Yet another object of the present invention is to provide printing processes for which aqueous-based inks are suitable and which employ microwave drying of the printed images.

Still another object of the present invention is to provide thermal ink jet printing processes employing microwave drying of the images which enable good print quality and minimal showthrough and strikethrough.

These and other objects of the present invention (or specific embodiments thereof) can be achieved by providing a printing process which comprises applying in imagewise fashion to a substrate an ink composition which comprises an aqueous liquid vehicle, a colorant, and and an ionic compound at least partially ionizable in the liquid vehicle, said ink composition having a conductivity of at least about 10 milliSiemens per centimeter, and subsequently exposing the substrate to microwave radiation, thereby drying the images on the substrate. Another embodiment of the present invention is directed to a thermal ink jet printing process which comprises (1) incorporating into a thermal ink jet printing apparatus an ink composition which comprises an aqueous liquid vehicle, a colorant, and and an ionic compound at least partially ionizable in the liquid vehicle, said ink composition having a conductivity of at least about 10 milliSiemens per centimeter; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

DETAILED DESCRIPTION OF THE INVENTION

Figure 1:
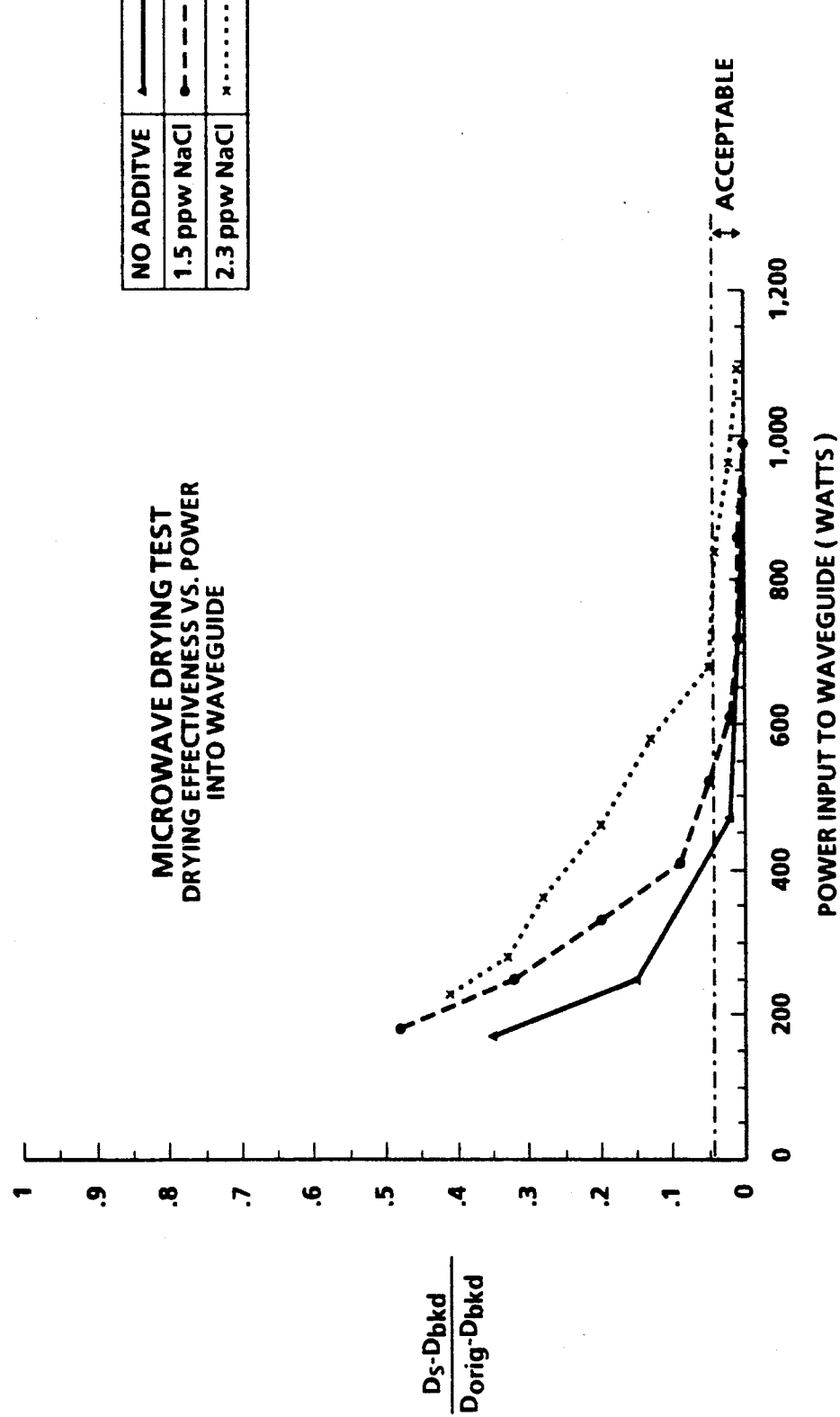
FIG. 1 represents a plot of the degree of offset of images generated on paper, comparing the offset of inks containing varying amounts of an ionic compound and dried by microwave radiation under varying power levels, as described in Example I.

The liquid vehicle of the inks employed for the process of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The non-water component of the liquid vehicle generally serves as a humectant which has a boiling point higher than that of water (100° C.). In the inks employed for the process of the present invention, the liquid vehicle is generally present in an amount of from about 50 to about 99.5 percent by weight, and preferably from about 60 to about 90 percent by weight, although the amount can be outside these ranges.

The colorant for the inks employed for the process of the present invention can be a dye. Examples of suitable dyes include anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Direct Brilliant Pink B (Crompton-Knolls); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; -Sirius Supra Yellow GD 167; Cartasol Brilliant Yellow 4GF (Sandoz); Pergasol Yellow CGP (Ciba-Geigy); Dermacarbon 2GT (Sandoz); Pyrazol Black BG (ICI); Morfast Black Conc A (Morton-Thiokol); Diazol Black RN Quad (ICI); Luxol Blue MBSN (Morton-Thiokol); Sevron Blue 5GMF (ICI); Basacid Blue 750 (BASF); Bernacid Red, available from Berncolors, Poughkeepsie, NY; Pontamine Brilliant Bond Blue; Berncolor A. Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Co. (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. The dye is present in any effective amount, typically from about 1 to about 20 percent by weight, and preferably from about 2 to about 6 percent by weight, although the amount can be outside these ranges.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toludine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Additional suitable commercially available pigment dispersions include the Hostafines available from Hoechst, including Hostafine Black T, Hostafine Black TS, Hostafine Yellow HR, Hostafine Yellow GR, Hostafine Red FRLL, Hostafine Rubine F6B, and Hostafine Blue B2G, as well as dispersions available from BASF, including Disperse Black 006607, Luconyl Yellow 1250, Basoflex Pink 4810, Luconyl Blue 7050, and the like. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 microns, although the particle size can be outside these ranges. The pigment is present in the ink composition in any effective amount, generally from about 1 to about 20 percent by weight and preferably from about 4 to about 8 percent by weight, although the amount can be outside of these ranges.

Other additives can also be present in the inks employed in the process of the present invention. For example, surfactants or wetting agents can be added to the ink. These additives may be of the cationic, anionic, or nonionic types. Suitable surfactants and wetting agents include Tamol® SN, Tamol® LG, those of the Triton® series available from Rohm and Haas Co., those of the Marasperse® series, those of the Igepal® series available from GAF Co., those of the Tergitol® series, those of the Duponol® series available from E.I. Du Pont de Nemours & Co., Emulphor ON 870 and ON 877, available from GAF, and other commercially available surfactants. These surfactants and wetting agents are present in effective amounts, generally from 0 to about 15 percent by weight, and preferably from about 0.01 to about 8 percent by weight, although the amount can be outside these ranges.

Polymeric additives can also be added to the inks employed in the process of the present invention to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the Discole series available from DKS International, Tokyo, Japan, the Jeffamine ® series available from Texaco, Bellaire, Tex., and the like. Polymeric additives may be present in the ink of the present invention in amounts of from 0 to about 10 percent by weight, and preferably from about 0.01 to about 5 percent by weight, although the amount can be outside these ranges.

Other optional additives to the inks employed in the process of the present invention include biocides such as Dowicil 150, 200, and 75, benzoate salts, sorbate salts, and the like, present in an amount of from about 0.0001 to about 10 percent by weight, and preferably from about 0.01 to about 4.0 percent by weight, although the amount can be outside these ranges, penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount can be outside these ranges, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, although the amount can be outside these ranges, or the like.

Other examples of suitable ink additives include those disclosed in copending application U.S. Ser. No. 07/738,024 (D/90058) and copending application U.S. Ser. No. 07/738,021 (D/90378), the disclosures of each of which are totally incorporated herein by reference.

The inks employed in the process of the present invention contain an ionic compound at least partially ionizable in the liquid vehicle. Preferably, the ionic compound is selected so that a relatively small amount is required in the ink to obtain the desired conductivity. For example, it is preferred that the ionic compound exhibit a high degree of dissociation in the aqueous liquid vehicle of the ink, since a higher degree of dissociation results in more free ions present in the liquid and thus results in higher conductivity for a given weight amount of the ionic compound. Generally, preferred ionic compounds exhibit a degree of dissociation of about 100 percent, although ionic compounds exhibiting lower degrees of dissociation can also be used. The ionic compound can be an acid, a base, or a salt. Typical cations include but are not limited to $H+$, $Li+$, $Na+$, $K+$, $Mg^{2+}$, $Ca^{2+}$, $Fe^{2+}$, $Fe^{3+}$, $Al^{3+}$, $NH_4+$, and the like. Typical anions include but are not limited to $OH-$, $F-$, $Cl-$, $Br-$, $I-$, $NO_3^-$, $SO_4^{2-}$, $CH_3COO^-$, and the like. Specific examples of suitable acids include but are not limited to HCl, HBr, HI, $HNO_3$, $H_2SO_4$, acetic acid, and the like. Specific examples of bases include but are not limited to LiOH, NaOH, KOH, Mg(OH)$_2$, Ca(OH)$_2$, Fe(OH)$_2$, Fe(OH)$_3$, Al(OH)$_3$, NH$_4$OH, and the like. Specific examples of suitable salts include but are not limited to NaCl, CaCl$_2$, NaI, NaNO$_3$, (NH$_4$)$_2$SO$_4$, NH$_4$Cl, LiCl, and the like. Generally, ionic compounds that enable higher ink conductivity per weight unit of ionic compound present in the ink are preferred. For example, compounds containing low molecular weight cations and anions generally result in higher conductivity per weight unit of compound present in the ink than do ionic compounds containing high molecular weight cations and anions. Thus, an ink containing 1 percent by weight of lithium chloride exhibits higher conductivity than an ink containing 1 percent by weight of potassium iodide, since the ink containing lithium chloride contains more free ions per unit of weight than the ink containing potassium iodide. Ionic compounds wherein only a small amount is required in the ink to achieve the desired conductivity are particularly preferred when the other ink components or characteristics, such as the dye or the colloidal dispersion stability, can be adversely affected by the presence of large amounts of ions. The ionic compound preferably is selected to optimize solubility of the other ingredients.

The amount of the ionic compound present in the ink can vary. Typically, the ink contains from about 0.25 to about 30 percent by weight of the ionic compound; for inorganic ionic compounds, preferably the ink contains from about 0.5 to about 5 percent by weight of the ionic compound, and for organic ionic compounds, preferably the ink contains from about 0.5 to about 25 percent by weight of the ionic compound, although the amounts can be outside of these ranges provided that the conductivity objectives of the present invention are achieved. This amount reflects the total amount of ionic compound present in the ink; thus, if another ink component, such as the dye or one of the additives, is also ionic, the amount of this material is also included in these ranges. The amount of the ionic compound present generally will also depend on the size and valency of the ions in the compound, the desired printing process speed, the desired ink conductivity, the size of the image with respect to dimensions and ink deposition density (milligrams per square centimeter) on paper, the power level of the microwave drying apparatus, and the like.

Generally, the inks employed in the process of the present invention have a conductivity of at least about 10 milliSiemens per centimeter, preferably at least 12 milliSiemens per centimeter, and more preferably from about 20 to about 50 milliSiemens per centimeter. Higher levels of conductivity generally enable microwave drying of the image with reduced power levels. Excessive conductivities, however, can adversely affect ink characteristics in that ink components such as dyes can be rendered insoluble in the liquid vehicle at high salt concentrations. In addition, at high conductivities, solid areas of images can boil and splatter before areas of smaller extent are dried. Thus, while at least partially depending on the degree of penetration of the ink into the substrate, conductivities for the inks employed in the process of the present invention are preferably within the stated range.

Inks suitable for the present invention can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. The ionic compound component of the ink can be added with the other ink ingredients during preparation of the ink; alternatively, the ionic compound can be added to an ink composition subsequent to mixing and stirring of the other ingredients. Any other suitable processes for preparing the inks can also be employed.

The ink is applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox ® series 10 paper, Xerox ® 4024 paper, or the like, coated papers, such as those available from Jujo, transparency materials suitable for aqueous inks or ink jet printing processes, or the like.

Figure 7A:
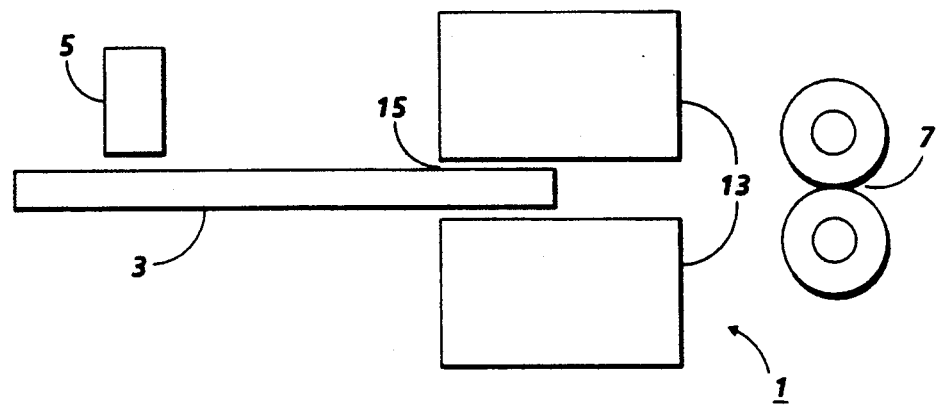
FIGS. 7A, 7B, and 7C illustrate schematically one printing system with a microwave drying apparatus suitable for the process of the present invention.
Figure 7B:
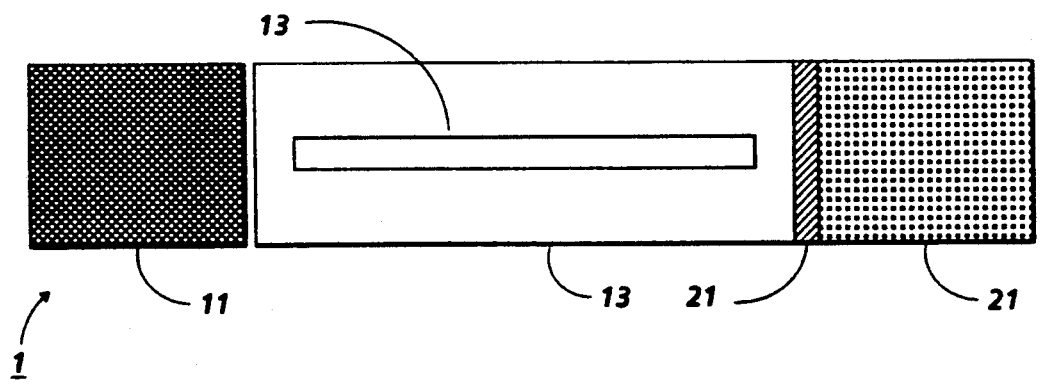
Figure 7C:
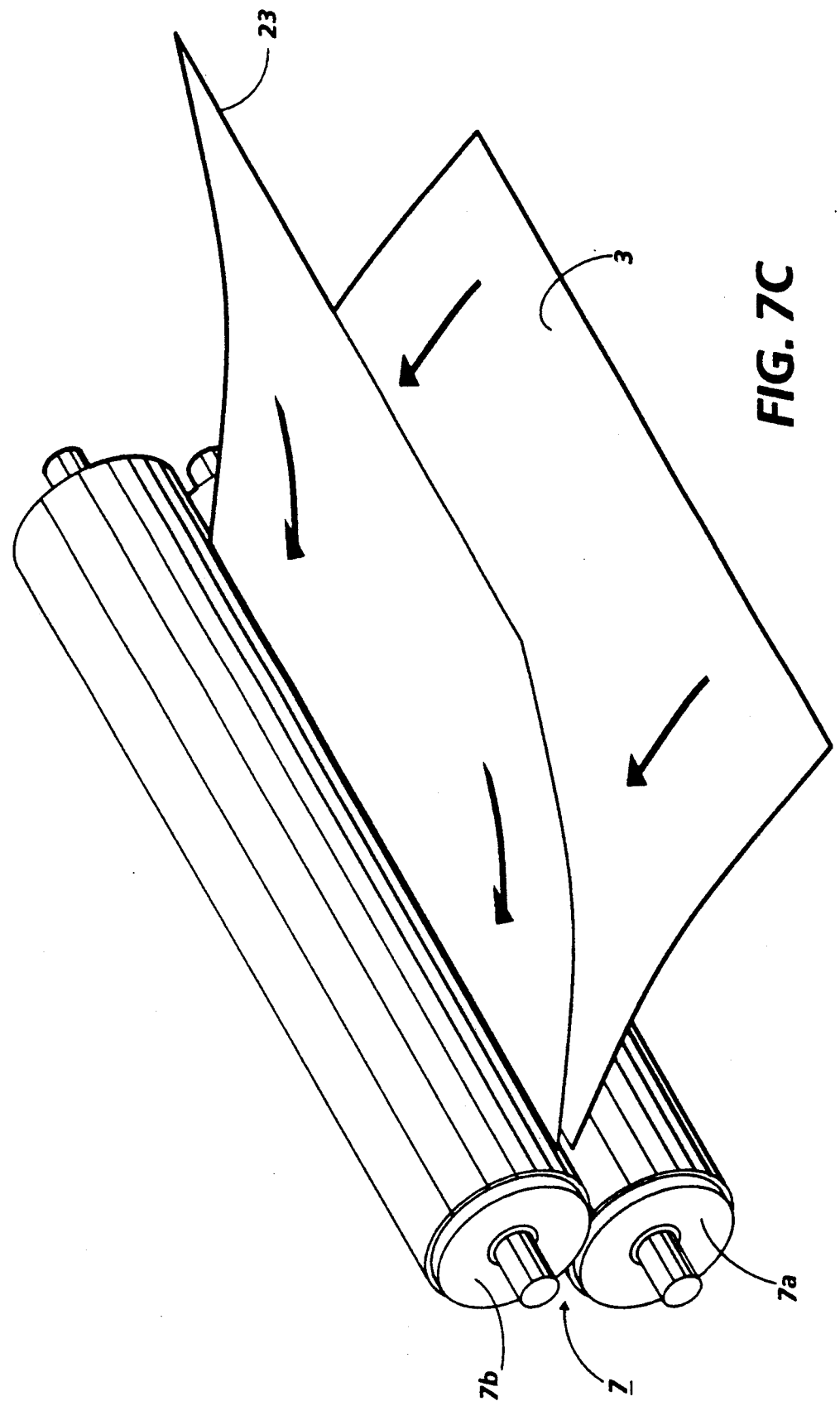

Any suitable microwave apparatus can be employed for the ink drying step of the present invention. One example of a printing system including a suitable microwave apparatus for drying ink on substrates and an optional method of testing the degree of drying is illustrated schematically in FIGS. 7A, 7B, and 7C. FIG. 7A represents a schematic side view of the apparatus wherein the paper path is from left to right. FIG. 7B represents a schematic side view of the apparatus viewed down the paper path. FIG. 7C represents a schematic view of the testing apparatus for determining the degree of drying. As illustrated schematically in FIGS. 7A, 7B, and 7C, microwave drying apparatus 1 is situated so that printing substrate 3, which can be paper, transparency material, or the like, is first printed with print head 5, passes through drying apparatus 1, and then exits drying apparatus 1 and passes through optional offset nip 7 which comprises two rollers, which preferably are a soft driver roll 7a (of a material such as rubber, for example) and a rigid idler roll 7b (coated with a material such as Teflon ®, for example). Apparatus 1 comprises magnetron 11 connected to rectangular wave guide 13 equipped with slot 15. One example of a suitable magnetron is the Gerling GL 116, available from John Gerling Co., Modesto, CA. One example of a suitable waveguide is the WR 284, available from Microwave Development Lab, Natick, MA. Slot 15 permits the printing substrate 3 to be passed through apparatus 1. At the terminal point of the wave guide 13 is a water cooled terminating dummy load 19 which absorbs any unused energy. Situated between wave guide 13 and terminating load 19 is a resonating iris 21 which generates high intensity traveling waves, which result in localized "hot spots" where the electric field is at a maximum. The print head 5 is aligned to coincide with a "hot spot." After print head 5 prints an image on printing substrate 3, printing substrate 3 passes through slot 15 in wave guide 13, whereupon a fixed amount of microwave power, generally from about 100 to about 1,000 watts, although the amount can be outside of this range, is supplied to the wave guide 13. Printing substrate 3 is passed through apparatus 1 at any suitable speed, typically from about 1.5 to about 40 inches per second. Optionally, after exiting apparatus 1 and wave guide 13, printing substrate 3 can be placed into contact with a blank sheet of paper 23 and the "sandwich" thus created can be passed through offset nip 7 to evaluate the effectiveness of the drying step. The nip pressure is set at the minimum to achieve the greatest level of offset. For example, with 14.25 inch rollers, an appropriate pressure would be about 14 pounds exerted on the entire roller. After exiting the nip, the sheets are separated and the offset density that is transferred to the blank sheet is measured. For comparison purposes, the process is repeated by passing the printed sheet through slot 15 with the microwave power off, and the degree of offset obtained with and without microwave drying are compared.

Any other suitable microwave drying apparatus can also be employed.

Offset is a practical measure of the state of dryness of the image; the degree of image drying at the time the image is contacted with a second sheet and passed through the pressure nip determines the amount of ink offset onto the second sheet, so that little or no offset to the second sheet occurs when the original image has reached an acceptable state of dryness. Some images can be prepared with inks that have a high absorptivity into the paper such that no offset is observed. In this instance, the image can pass through the roller with no offset being observed even if no microwave power is previously applied to the image. In this instance, "drying" is achieved by fast penetration of the ink into the bulk of the paper from the paper surface. Images made with such an ink, however, are characterized by a high degree of image showthrough, or visibility of the image on the side of the paper opposite to that bearing the image. With such inks, occurrences of image strikethrough are common, where the ink is seen to have penetrated completely through the paper and emerged on the reverse side. Images made with such inks also tend to have lower optical density and to be poorer in other measures of image quality such as edge raggedness. In addition, the prints will have a high degree of cockle if no microwave drying is used. Turning the microwave power on to a sufficient level with any ink of this type with the proper level of condictivity can remove the cockle, but the other image quality defects will remain. Thus, it may be desirable to select an ink that penetrates the paper somewhat less rapidly and that is suitable for microwave drying. However, a suitable level of penetration of the ink into the paper is also desirable. Inks with insufficient levels of penetration into the paper may require higher levels of microwave power to dry, may be prone to image defects as a result of ink boiling and splattering, and may be prone to unacceptable mottle or nonuniformity in solid areas.

Accordingly, in a preferred embodiment, the ink is selected to exhibit an optimal degree of penetration into the substrate. Prints generated by exposing to microwave radiation images made with inks containing ionic compounds, having conductivities of at least about 10 milliSiemens per centimeter, and exhibiting relatively rapid substrate penetration rates exhibit increased drying times compared to prints generated by exposing to microwave radiation images made with inks containing ionic compounds, having conductivities of at least about 10 milliSiemens per centimeter, and exhibiting relatively slow substrate penetration rates. The desired degree of penetration will depend in part upon the nature of the substrate selected, the importance of high image quality (image quality tends to be decreased by increased penetration rates), and whether disadvantages such as image showthrough are important in the particular application. The penetration rates of aqueous inks into substrates such as paper can be increased by including penetration enhancers in the ink. Examples of materials that enhance penetration rates include polyethyleneimines derivatized with polyethylene oxide and polypropylene oxide, such as the Discole series availabe from DKS International, Tokyo, Japan, the Jeffamine ® series available from Texaco, Bellaire, Tex., and the like, N-methylpyrrolidinone, dimethylsulfoxide, cyclohexylpyrrolidinone, 1,2-hexanediol, and butyl carbitol, available from Aldrich Chemical Co., Milwaukee, WI, and the like; as well as mixtures thereof. The penetration enhancer can be present in any effective amount, typically from about 0.0001 to about 10 percent by weight of the ink, and preferably from about 0.01 to about 4 percent by weight, although the amount can be outside these ranges.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. To 48.3 parts by weight of deionized water were added 40 parts by weight of ethylene glycol, 11.5 parts by weight of Basacid Black X34 black dye liquid (containing about 30 percent by weight dye, obtained from BASF), 0.1 parts by weight sorbic acid as a preservative, and 0.13 parts by weight of polyoxyethylated (20) oleyl alcohol (Emulphor ON-877, obtained from GAF) as a surfactant. The ingredients were mixed together at room temperature for about 30 minutes and then filtered through a 1 micron absolute cartridge filter to remove particulate matter.

Thereafter, three samples of the ink thus prepared were isolated. To one sample no ionic compound was added, resulting in an ink with a conductivity ($\sigma$) of 4 milliSiemens per centimeter. To the second sample was added 1.5 percent by weight of the ink composition of sodium chloride (NaCl) resulting in an ink with a conductivity of 12 milliSiemens per centimeter. To the third sample was added 2.3 percent by weight of the ink composition of NaCl, resulting in an ink with a conductivity of 16 milliSiemens per centimeter. Images were then generated on Courtland 4200 plain paper with each of these inks by printing a solid area pattern 0.64 inches by 4 inches with 2 milligrams per square centimeter of ink from a 300 spot per inch thermal ink jet printhead delivering 140 picoliter drops at 300 spots per inch. 400 milliseconds after exiting the microwave applicator, a second sheet of Courtland 4200 paper was placed in contact with the surface of the printed sheet and the two sheets were passed through a cold pressure nip formed by two rollers, with the roller length being 14.25 inches and the pressure being about 0.25 pounds as measured at each end of the rollers. The papers passed through the nip at a rate of 5 inches per second. The thermal ink jet printhead was situated 2 inches from the edge of the microwave power source wave guide (13 as shown in FIGS. 7A and 7B), the wave guide (13) extended for a length of 1.3 inches along the paper path, and the cold pressure nip (7 as shown in FIGS. 7A and 7C) was situated 3 inches from the exiting edge of the wave guide (13). Subsequently, the degree of image offset (amount of ink transferred from the imaged sheet to the second sheet) was measured in terms of the optical density of the ink transferred onto the second sheet. Specifically, the degree of offset was determined by measuring the optical density of the ink transferred onto the second sheet, and the optical density of the background, non-image-bearing areas of the paper was subtracted from this number. The optical density of an original image (prepared by the same printing process described above except that the printed image was not contacted with a second sheet of paper and passed through a pressure nip subsequent to microwave drying) was also measured, and the optical density of the background, non-image-bearing areas of the paper was subtracted from this number. The microwave power required for drying was defined as the power required to reach an offset density of 0.05 OD (optical density units) or less. Offset was expressed by the following equation:

$$\frac{D_S - D_{bkg}}{D_{orig} - D_{bkg}}$$

wherein $D_s$ represents the optical density of the ink transferred onto the second sheet, $D_{bkg}$ represents the optical density of the background, non-image-bearing areas of the paper, and $D_{orig}$ represents optical density of an original image. The values for offset at varying levels of microwave power input to the waveguide in the microwave apparatus were as follows for each of the inks:

| Power Input to Waveguide (Watts) | $[D_s\text{-}D_{bkg}]/[D_{orig}\text{-}D_{bkg}]$ |
|---|---|
| Ink containing no added ionic compound; $\sigma = 4$ | |
| 230 | 0.41 |
| 280 | 0.33 |
| 360 | 0.28 |
| 460 | 0.20 |
| 580 | 0.13 |
| 680 | 0.05 |
| 840 | 0.04 |
| 960 | 0.02 |
| 1090 | 0.01 |
| Ink containing 1.5 parts by weight NaCl; $\sigma = 12$ milliSiemens/cm | |
| 180 | 0.48 |
| 250 | 0.32 |
| 330 | 0.20 |
| 410 | 0.09 |
| 520 | 0.05 |
| 610 | 0.02 |
| 720 | 0.01 |
| 860 | 0.01 |
| 990 | 0 |

These results are illustrated by a plot of the data points as shown in FIG. 1, wherein the dotted line represents the ink containing no ionic compound and having a conductivity of 4 milliSiemens per centimeter, the dashed line

| Power Input to Waveguide (Watts) | $[D_s\text{-}D_{bkg}]/[D_{orig}\text{-}D_{bkg}]$ |
|---|---|
| Ink containing 2.3 parts by weight NaCl; $\sigma = 16$ milliSiemens/cm | |
| 170 | 0.35 |
| 250 | 0.15 |
| 470 | 0.02 |
| 720 | 0.01 |
| 920 | 0 | represents the ink containing 1.5 parts by weight of sodium chloride and having a conductivity of 12 milliSiemens per centimeter, and the solid line represents the ink containing 2.3 parts by weight of sodium chloride and having a conductivity of 16 milliSiemens per centimeter. All measurements and processes were carried out at ambient conditions of 73° F. and 39 to 45 percent relative humidity.

As the data indicate, the degree of offset drops to an acceptable level (about 0.04) for the ink containing no ionic compound only when the microwave power applied is about 850 watts. In contrast, for the ink containing 1.5 percent by weight of sodium chloride, the degree of offset drops to an acceptable level when the microwave power applied is about 560 watts, and for the ink containing 2.3 percent by weight of sodium chloride, the degree of offset drops to an acceptable level when the microwave power applied is about 440 watts. Thus, the inks containing a salt ionizable in the liquid vehicle and having a conductivity of over 10 milliSiemens per centimeter required lower power levels of microwave radiation to result in an acceptable level of drying (and thus an acceptable level of offset) within the 260 millisecond period during which microwave radiation was applied, compared to the ink containing no salt ionizable in the liquid vehicle and a conductivity of 4 milliSiemens per centermeter.

EXAMPLE II

An ink composition was prepared as follows. To 48.3 parts by weight of deionized water were added 40 parts by weight of ethylene glycol, 11.5 parts by weight of Basacid Black X34 black dye liquid (containing about 30 percent by weight dye, obtained from BASF), 0.1 parts by weight sorbic acid as a preservative, and 0.13 parts by weight of polyoxyethylated (20) oleyl alcohol (Emulphor ON-877, obtained from GAF) as a surfactant. The ingredients were mixed together at room temperature for about 30 minutes and then filtered through a 1 micron absolute cartridge filter to remove particulate matter.

Figure 8:
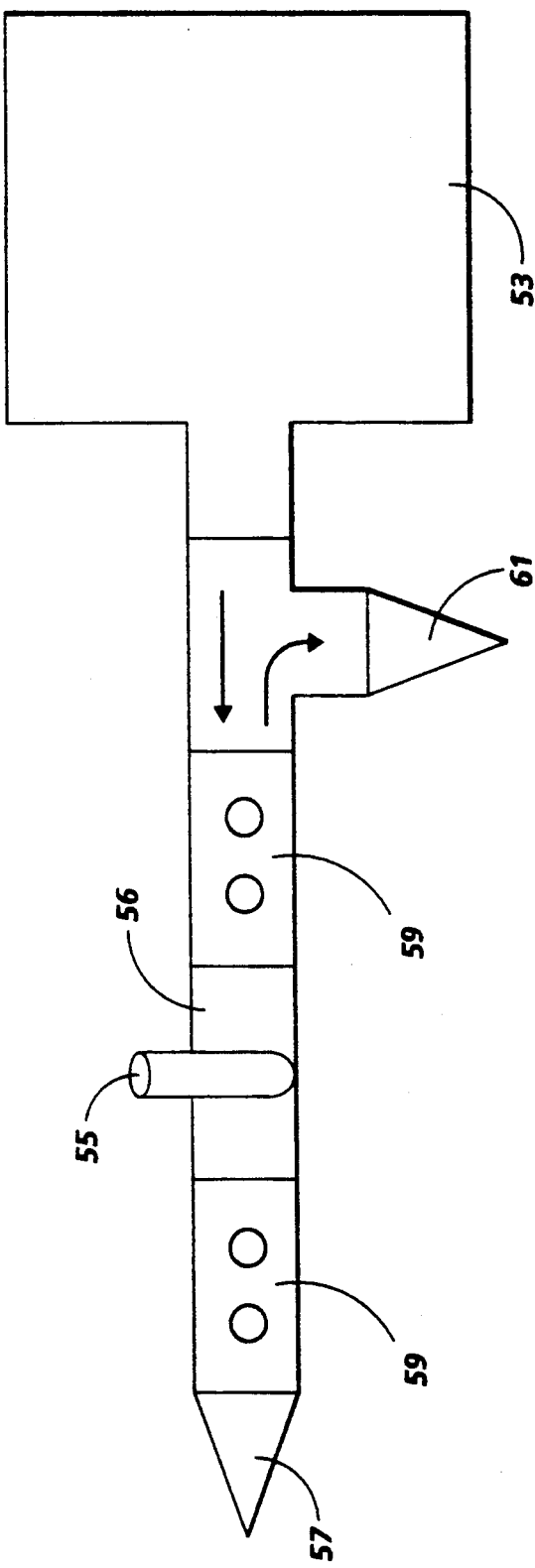
FIG. 8 illustrates schematically an apparatus for testing microwave drying of inks used in Examples II, III, and IV.

Thereafter, six samples of the ink thus prepared were isolated. To one sample no ionic compound was added, resulting in an ink with a conductivity of 2.3 milliSiemens per centimeter. To the second sample was added 1.5 percent by weight of sodium chloride (solid), resulting in an ink with a conductivity of 12 milliSiemens per centimeter. To the third sample was added 6.0 percent by weight of a 6.1 molal solution of sodium chloride, resulting in an ink with a conductivity of 12.0 milliSiemens per centimeter. To the fourth sample was added 5.7 percent by weight of a 6.45 molal solution of calcium chloride dihydride, resulting in an ink with a conductivity of 12.9 milliSiemens per centimeter. To the fifth sample was added 7.8 percent by weight of an 11.5 molal solution of sodium iodide, resulting in an ink with a conductivity of 12.6 milliSiemens per centimeter. To the sixth sample was added 6.2 percent by weight of a 9.9 molal solution of sodium nitrate, resulting in an ink with a conductivity of 12.4 milliSiemens per centimeter. Each sample was then placed in a polystyrene test tube so that each tube contained 1.75 grams of the selected ink, and the test tubes were each placed in a test fixture as illustrated schematically in cross-section in FIG. 8. As shown in FIG. 8, apparatus 51 (equipment all provided by John Gerling Co., Modesto, CA, model numbers provided after reference numbers) comprises magnetron 53 (GL 116), test tube 55, test tube applicator 56 (GL 503), short dummy load 57 (GL 402A), directional power transducer 59 (dummy directional coupler GL 214), and three-part circulator 61 (GL 401A). Magnetron 53 sends energy down straight applicator 56 and the energy is terminated at water cooled dummy load 57, which ensures that no energy is reflected. The straight applicator 56 has a hole for the insertion of a test tube 55. The magnetron timer was set for a 4 second on-time duration, and the power output of the magnetron was varied at 250, 300, and 350 Watts. Energy input into the sample in the test tube was recorded by directional couplers 59 placed before and after the test tube coupler. The ink sample of 1.75 grams was placed in the tared polystyrene test tube and the ambient temperature was recorded by using a thermocouple. The thermocoupler bead was dipped ⅔ of the way into the sample to record the temperature. Subsequently, the thermocoupler bead was rinsed with distilled water and wiped dry. The sample was then placed into the test tube coupler chamber, and microwave power was applied for the fixed time of 4 seconds. Immediately after the magnetron was switched off, the sample was capped with a thumb and gently rolled over to ensure uniform temperature. The temperature of the sample was then recorded with the thermocouple. The directional couplers provided information regarding the energy input and the energy going to the terminator; the difference between the two yields the energy absorbed by the sample. Each sample was run at the three aforementioned magnetron power levels, with the initial temperature, the post-heating temperature, and the energy input into the waveguide recorded with each trial. Each test tube was exposed to microwave radiation for a period of 4 seconds (from t=0 to t=4 seconds), and one second after microwave radiation ceased (at t=5 seconds), the temperature of the ink in the test tube was measured. The values for temperature at varying levels of microwave power input to the waveguide in the microwave apparatus were as follows for each of the inks:

| Power Input to Waveguide (Watts) | Temperature (°F.) |
|---|---|
| Ink containig no added ionic compound | |
| 340 | 34.8 |
| 350 | 35.0 |
| 390 | 39.8 |
| 440 | 44.1 |
| 450 | 44.0 |
| 530 | 49.3 |
| Ink containing 1.5 percent by weight NaCl | |
| 370 | 57.9 |
| 420 | 68.2 |
| 520 | 80.7 |
| Ink containing 1.5 percent by weight NaCl | |
| 330 | 52.5 |
| 440 | 68.9 |
| Ink containing 2.6 percent by weight calcium chloride dihydrate | |
| 350 | 54.9 |
| 440 | 66.9 |
| Ink containing 4.6 percent by weight sodium iodide | |
| 350 | 53.9 |
| 430 | 70.3 |
| Ink containing 2.6 percent by weight sodium nitrate | |
| 350 | 53.2 |
| 440 | 68.2 |

Figure 2:
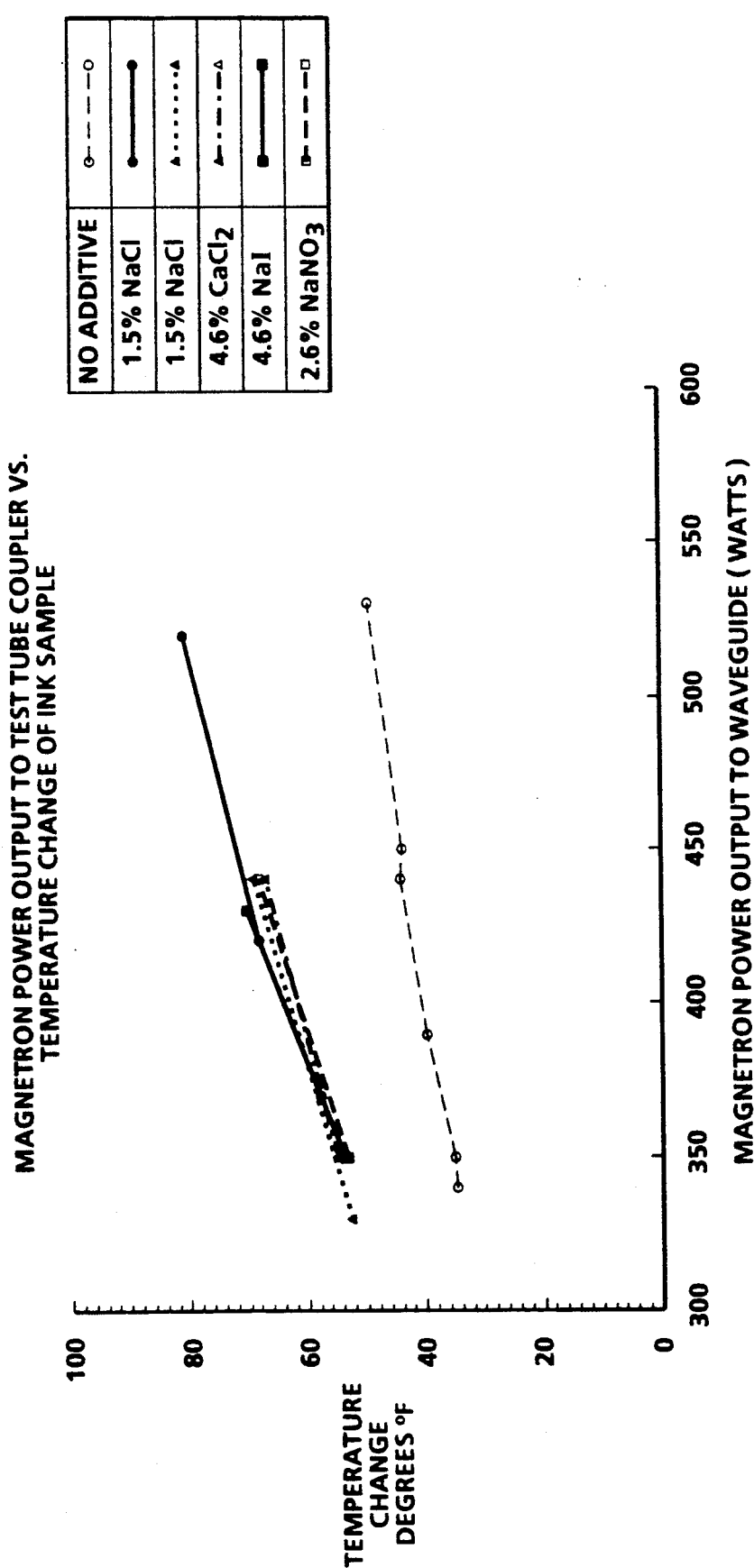
FIGS. 2, 3, and 4 represent plots of the rise in temperature of inks containing varying amounts of an ionic compound when exposed to microwave radiation under varying power levels, as described in Examples II, III, and IV.

These results are illustrated by a plot of the data points as shown in FIG. 2, wherein the dashed line with circular data points represents the ink containing no ionic compound and having a conductivity of 2.3 milliSiemens per centimeter, the solid line with circular data points represents the ink containing 1.5 percent by weight of sodium chloride and having a conductivity of 12 milliSiemens per centimeter, the dotted line with triangular data points represents the ink containing 1.5 percent by weight of sodium chloride and having a conductivity of 12 milliSiemens per centimeter, the dotted and dashed line with triangular data points represents the ink containing 4.6 percent by weight of calcium chloride and having a conductivity of 12.9 milliSiemens per centimeter, the solid line with square data points represents the ink containing 4.6 percent by weight of sodium iodide and having a conductivity of 12.6 milliSiemens per centimeter, and the dashed line with square data points represents the ink containing 2.6 by weight of sodium nitrate and having a conductivity of 12.4 milliSiemens per centimeter.

As the data indicate, the addition of an ionic compound to the ink greatly increases the temperature rise in the ink upon exposure to a given microwave power level for a set period of time. These results indicate that the inks containing an ionic compound absorb more energy from the microwave radiation than does the ink containing no added ionic compound. For instance, by interpolating the data in the Figure, one would predict a temperature rise of about 62° F. for the inks containing ionic compounds at a microwave power level of 400 watts, versus a temperature rise of only 40° F. for the ink containing no added ionic compound. The Figure also shows that the temperature rise is the same for all of the ionic compounds used in this example, as long as they are present in amounts that give the same conductivity.

EXAMPLE III

An ink composition was prepared as follows. To 48.3 parts by weight of deionized water were added 40 parts by weight of ethylene glycol, 11.5 parts by weight of Basacid Black X34 black dye liquid (containing 30 percent by weight dye, obtained from BASF), 0.1 parts by weight sorbic acid as a preservative, and 0.13 parts by weight of polyoxyethylated (20) oleyl alcohol (Emulphor ON-877, obtained from GAF) as a surfactant. The ingredients were mixed together at room temperature for about 30 minutes and then filtered through a 1 micron absolute cartridge filter to remove particulate matter.

Thereafter, two samples of the ink thus prepared were isolated. To one sample was added 4.7 percent by weight of a 6.54 molal solution of ammonium chloride, resulting in an ink with a conductivity of 12.2 milliSiemens per centimeter. To the second sample was added 3.4 percent by weight of a 17.7 molal solution of lithium chloride, resulting in an ink with a conductivity of 12.3 milliSiemens per centimeter. Each sample was then placed in a polystyrene test tube so that each tube contained 1.75 grams of the selected ink, and the test tubes were each placed in a test fixture as illustrated schematically in cross-section in FIG. 8 and subjected to the procedure described in Example II. Each test tube was exposed to microwave radiation for a period of 4 seconds (from $t=0$ to $t=4$ seconds), and one second after microwave radiation ceased (at $t=5$ seconds), the temperature of the ink in the test tube was measured. The values for temperature at varying levels of microwave power input to the waveguide in the microwave apparatus were as follows for each of the inks:

| Power Input to Waveguide (Watts) | Temperature (°F.) |
| --- | --- |
| Ink containing 1.2 percent by weight ammonium chloride | |
| 330 | 52.2 |
| 390 | 58.4 |
| 460 | 74.0 |
| Ink containing 1.4 percent by weight lithium chloride | |
| 320 | 54.6 |
| 390 | 57.8 |
| 470 | 74.5 |

Figure 3:
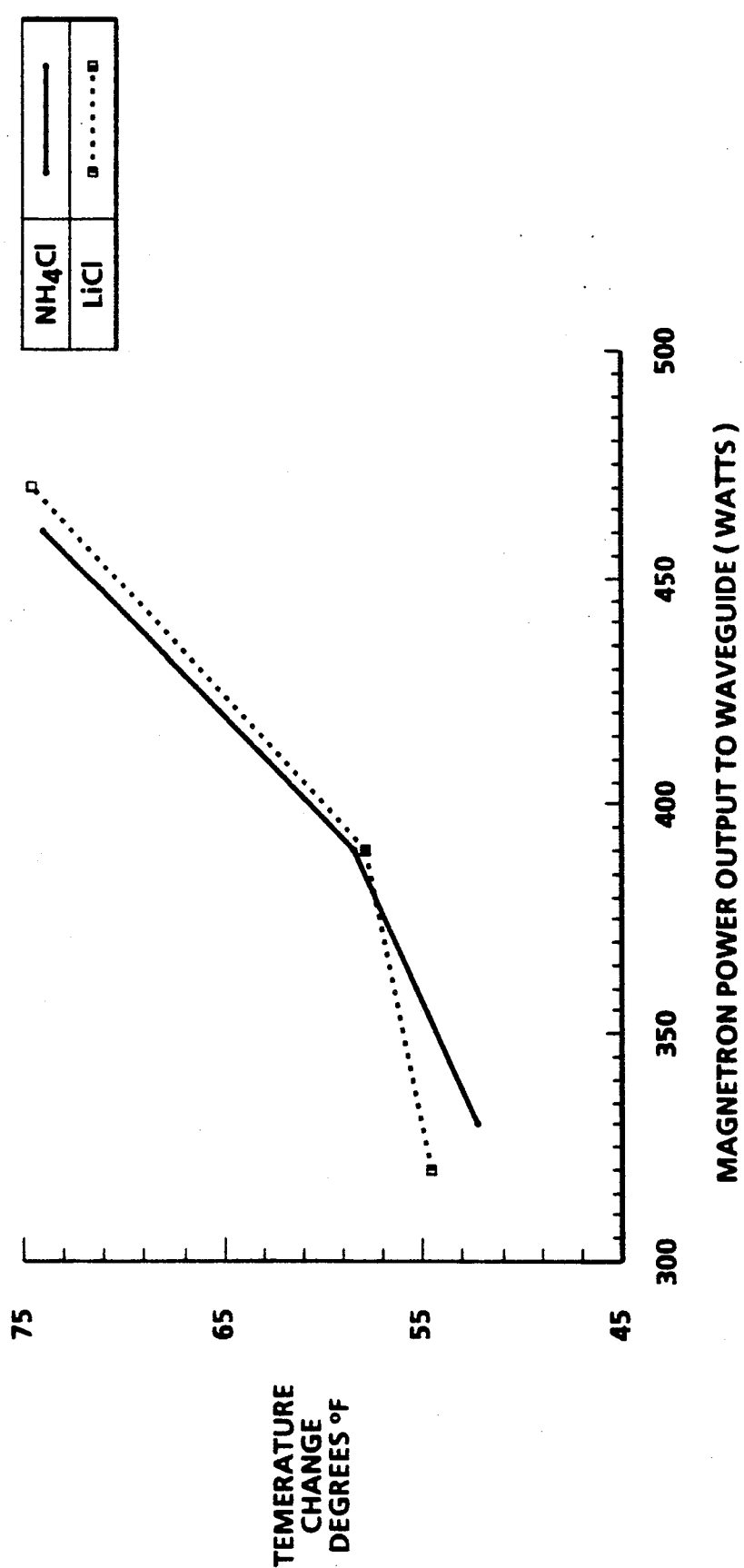

These results are illustrated by a plot of the data points as shown in FIG. 3, wherein the solid line with circular data points represents the ink containing 1.2 percent by weight of ammonium chloride and having a conductivity of 12.2 milliSiemens per centimeter and the dotted line with square data points represents the ink containing 1.4 percent by weight of lithium chloride and having a conductivity of 12.3 milliSiemens per centimeter.

As the data indicate, the inks containing these ionic compounds resulted in temperature increases upon exposure to microwave radiation that are greater than that of the ink containing no added ionic compound (as described in Example II), which indicates that the presence of the indicated ionic compounds increases the microwave absorption capability of the ink. In this case, the temperature rise of the inks containing the ionic compounds can be interpolated to be 60° F. at 400 watts versus only 40° F. for the ink containing no added ionic compound. As before in Example II, the specific salt added does not matter provided that the conductivity is adjusted to the same value. In Examples II and III, various amounts of the specific salts used were required to obtain an ink with a conductivity of about 12 milliSiemens per centimeter. Ionic compounds that require lesser amounts to achieve the desired conductivity and/or relatively inexpensive ionic compounds thus are preferred.

EXAMPLE IV 5 ink compositions were prepared as follows. To deionized water were added 5.25 parts by weight of diethylene glycol, 3 parts by weight of Food Dye #2 (obtained from Mobay Chemical Co.), and varying amounts as indicated in the table below of Discole N-518 (obtained from DKS International, Tokyo, Japan as a surfactant to obtain inks with the indicated compositions. The ingredients were mixed together at room temperature for about 30 minutes and then filtered through a 1 micron absolute cartridge filter to remove particulate matter. Subsequently, inks were prepared by adding to the mixture thus prepared varying amounts of a 6.1 molal solution of sodium chloride (NaCl) to obtain inks with sodium chloride contents as indicated in the table. The conductivity of each ink composition was then determined with a Yellow Springs Instruments Model 32 conductance meter with a YSI #3417 probe, with the following results:

| Ink | % NaCl in Ink | Grams Discole N-518 in 200 grams of ink | Conductivity (millimhos per centimeter) |
| --- | --- | --- | --- |
| 1 | 0 | 0.50 | 6.57 |
| 2 | 1.09 | 1.34 | 19.5 |
| 3 | 2.90 | 0.61 | 40.5 |
| 4 | 5.88 | 0.53 | 71.4 |
| 5 | 12.48 | 0.52 | 117.5 |

Each of these inks was then subjected to microwave radiation in a test tube in an apparatus as shown in FIG. 8 by the procedure described in Example II. The results were as follows:

| Energy Input to Waveguide (Joules) | Temperature change (°F.) |
| --- | --- |
| Deionized Water (control) | |
| 910 | 15.6 |
| 1080 | 17.8 |
| 1280 | 19.8 |
| 1470 | 22.1 |
| Ink #1 | |
| 870 | 21.5 |
| 1080 | 27.2 |
| 1300 | 31.7 |
| 1430 | 34.9 |
| Ink #2 | |
| 910 | 31.2 |
| 990 | 39.3 |
| 1190 | 46.1 |
| 1450 | 54.9 |
| Ink #3 | |
| 880 | 40.6 |
| 1070 | 49.4 |
| 1290 | 58.9 |
| 1470 | 63.8 |
| Ink #4 | |
| 890 | 42.3 |
| 1080 | 49.6 |
| 1260 | 59.1 |
| 1470 | 63.8 |
| Ink #5 | |
| 930 | 46.5 |
| 1100 | 49.0 |
| 1260 | 54.8 |

Figure 4:
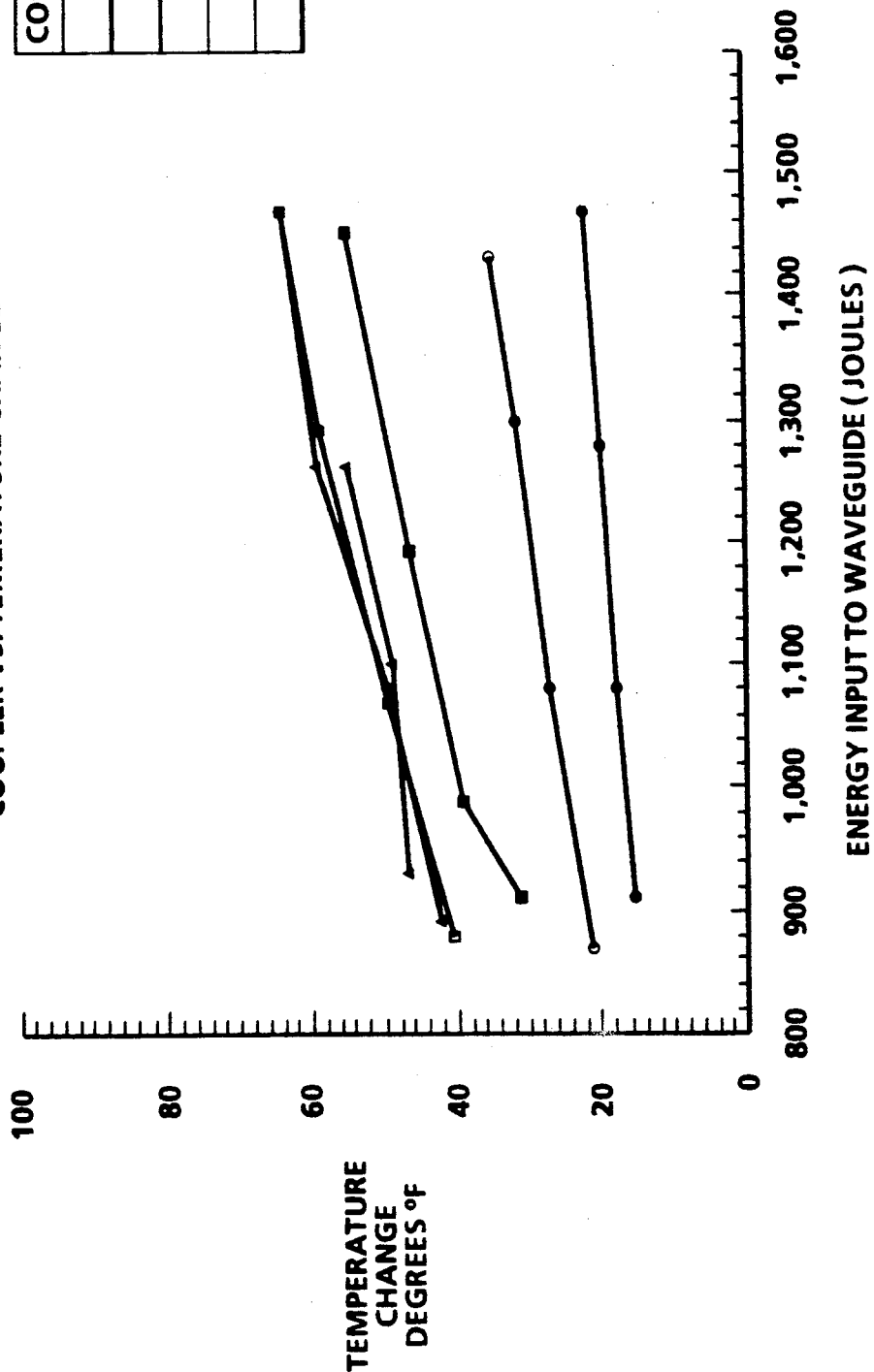

These data are illustrated by a plot of the data points as shown in FIG. 4, wherein the line with solid circular data points represents the control ink, the line with hollow circular data points represents ink #1, the line with solid square data points represents ink #2, the line with the hollow square data points represents ink #3, the line with the solid triangular data points represents ink #4, and the line with the hollow triangular data points represents ink #5. As the data indicate, the temperature increase observed for each of the inks increases up to a conductivity of about 40 or 50 milliSiemens per centimeter, upon which the effect tends to level off or slightly decrease. Thus, while inks employed in the process of the present invention can contain an ionic compound that will result in conductivities higher than about 40 or 50 milliSiemens per centimeter, higher conductivities generally are not necessary to obtain optimal ink heating upon exposure to microwave radiation and resulting rapid drying, and increased ionic compound concentrations may not be desirable because they may adversely affect the pH of the ink and/or decrease the solubility of other ink components.

EXAMPLE V

Ink compositions were prepared as follows. To deionized water were added Food Black #2 Dye in the amount indicated (percent by weight of the ink) in the table below, diethylene glycol in the amount indicated (percent by weight of the ink) in the table below, and 4 percent by weight Discole N-518 polymeric surfactant. The ingredients were mixed together at room temperature for about 30 minutes and then filtered through a 1 micron absolute cartridge filter to remove particulate matter. Subsequently, inks were prepared by adding to the mixture thus prepared varying amounts of a 6.1 molal solution of sodium chloride (NaCl) to obtain inks with conductivities as indicated in the table.

A sample of each ink was then incorporated into a thermal ink jet test fixture as described in Example I, and images comprising both solid areas and text areas were formed and dried with a microwave drying apparatus as described in Example I except that solid images were printed at 1.8 milligrams per square centimeter ink density. Dryness was evaluated as described in Example I. The total energy required to dry text and solid areas to the point of zero offset density for images formed with each ink and the general offset data is shown in the tables below.

| Ink | % Dye | % Di-ethylene Glycol | Conductivity (milli-Siemens per centimer) | Total Energy Required to Dry Solid Areas (Joules) | Total Energy Required to Dry Text Areas (Joules) |
| --- | --- | --- | --- | --- | --- |
| 1 | 3 | 5 | 20.8 | 977 | 1397 |
| 2 | 4 | 5 | 20.9 | 1185 | 1400 |
| 3 | 3 | 5 | 6.79 | >1800 | 1637 |
| 4 | 4 | 20 | 6.05 | 1680 | >1800 |
| 5 | 4 | 5 | 8.91 | 1584 | >1800 |
| 6 | 3 | 20 | 5.01 | >1800 | >1800 |
| 7 | 3 | 20 | 19.7 | 1096 | >1800 |
| 8 | 4 | 20 | 21.4 | 941 | 1318 |

| Power Input to Waveguide (Watts) | $[D_S-D_{bkg}]/[D_{orig}-D_{bkg}]$ |
| --- | --- |
| Ink #1 | |
| 265 | 0.03 |
| 320 | 0.02 |
| 365 | 0.01 |
| 410 | 0 |
| Ink #2 | |
| 275 | 0.06 |
| 320 | 0.04 |
| 365 | 0.03 |
| 420 | 0.02 |
| 460 | 0.01 |
| 490 | 0.005 |
| 540 | 0 |
| Ink #3 | |
| 315 | 0.26 |
| 370 | 0.18 |
| 415 | 0.16 |
| 440 | 0.13 |
| 465 | 0.11 |
| 545 | 0.09 |
| 585 | 0.08 |
| 640 | 0.08 |
| 690 | 0.07 |
| Ink #4 | |
| 270 | 0.29 |
| 320 | 0.23 |
| 360 | 0.08 |
| 405 | 0.07 |
| 440 | 0.08 |
| 480 | 0.02 |
| 525 | 0.02 |
| 565 | 0.02 |
| 615 | 0.015 |
| Ink #5 | |
| 310 | 0.26 |
| 350 | 0.17 |
| 395 | 0.12 |
| 440 | 0.11 |
| 475 | 0.07 |
| 520 | 0.05 |
| 560 | 0.04 |
| 610 | 0.02 |
| Ink #6 | |
| 250 | 0.33 |
| 350 | 0.09 |
| 430 | 0.06 |
| 475 | 0.04 |
| 510 | 0.03 |
| 560 | 0.02 |
| 605 | 0.02 |
| Ink #7 | |
| 260 | 0.14 |
| 300 | 0.04 |
| 345 | 0.04 |
| 390 | 0.03 |
| 430 | 0.03 |
| 465 | 0.02 |
| 495 | 0.01 |
| 535 | 0 |
| Ink #8 | |
| 255 | 0.09 |
| 300 | 0.04 |
| 355 | 0.02 |
| 390 | 0.01 |

Figure 5:
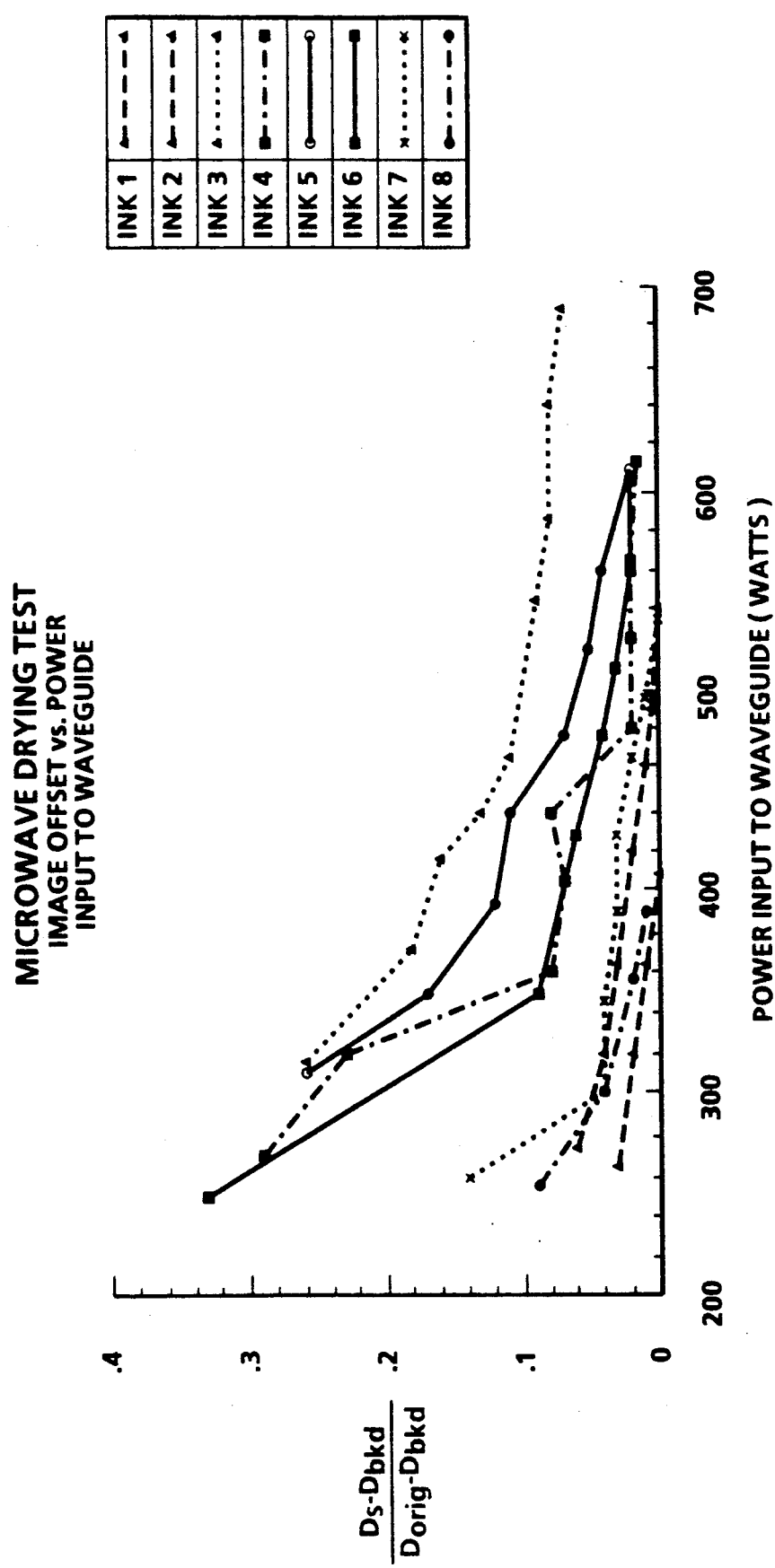
FIG. 5 represents a plot of the degree of offset of images generated on paper, comparing the offset of inks containing varying amounts of an ionic compound and dried by microwave radiation under varying power levels, as described in Example V.

For the offset measurements at varying microwave power levels, the total time the printed sheet was exposed to the microwave dryer was 2.4 seconds. The offset results for varying levels of microwave power are illustrated by a plot of the data points as shown in FIG. 5, wherein the dashed line with solid triangular data points represents ink #1, the dashed line with hollow triangular data points represents ink #2, the dotted line with solid triangular data points represents ink #3, the dotted and dashed line with solid square data points represents ink #4, the solid line with hollow circular data points represents ink #5, the solid line with solid square data points represents ink #6, the dotted line with "X" data points represents ink #7, and the dotted and dashed line with solid circular data points represents ink #8. As the data indicate, the inks with the higher conductivities require significantly less energy input to dry the solid areas, and the higher conductivity inks also required comparable or less microwave power to dry the text areas compared to inks of the same composition except for a lower ionic compound content and correspondingly lower conductivity. Text area drying is most sensitive to ink penetration rates, which is often dependent on the concentration of the cosolvent (in this instance, ethylene glycol), which explains the relatively high text area drying energies required for some of the high conductivity inks.

EXAMPLE VI

Ink compositions were prepared as follows. To deionized water were added Food Black #2 Dye in the amount indicated (percent by weight of the ink) in the table below, diethylene glycol in the amount indicated (percent by weight of the ink) in the table below, and 4 percent by weight Discole N-509 polymeric surfactant. The ingredients were mixed together at room temperature for about 30 minutes and then filtered through a 1 micron absolute cartridge filter to remove particulate matter. Subsequently, inks were prepared by adding to the mixture thus prepared varying amounts of a 6.1 molal solution of sodium chloride (NaCl) to obtain inks with conductivities as indicated in the table.

A sample of each ink was then incorporated into a thermal ink jet test fixture as described in Example I, and images comprising both solid areas and text areas were formed and dried with a microwave drying apparatus as described in Example I except that solid areas were printed at 1.8 milligrams per square centimeter ink density. Dryness was evaluated as described in Example I. The total energy required to dry text and solid areas to the point of zero offset density for images formed with each ink and the general offset data is shown in the tables below.

| Ink | % Dye | % Diethylene Glycol | Conductivity (milli-Siemens per centimer) | Total Energy Required to Dry Solid Areas (Joules) | Total Energy Required to Dry Text Areas (Joules) |
| --- | --- | --- | --- | --- | --- |
| 1 | 3 | 5 | 20.3 | 820 | 1301 |
| 2 | 3 | 5 | 6.02 | 1219 | 1500 |
| 3 | 4 | 20 | 19.8 | 911 | 1240 |
| 4 | 3 | 20 | 20.4 | 835 | 1116 |
| 5 | 4 | 20 | 5.43 | 1470 | >1800 |
| 6 | 3 | 20 | 4.24 | 1608 | >1800 |
| 7 | 4 | 5 | 18.2 | 1037 | 1315 |
| 8 | 4 | 5 | 8.16 | 1225 | 1585 |

| Power Input to Waveguide (Watts) | $[D_s\text{-}D_{bkg}]/[D_{orig}\text{-}D_{bkg}]$ |
| --- | --- |
| Ink #1 | |
| 250 | 0.03 |
| 295 | 0.01 |
| 340 | 0 |
| Ink #2 | |
| 250 | 0.03 |
| 340 | 0.02 |
| 420 | 0.01 |
| 485 | 0 |
| Ink #3 | |
| 255 | 0.01 |
| 300 | 0.005 |
| 350 | 0 |
| Ink #4 | |
| 255 | 0.02 |
| 305 | 0.01 |
| 350 | 0 |
| Ink #5 | |
| 260 | 0.05 |
| 300 | 0.02 |
| 350 | 0.015 |
| 390 | 0.015 |
| 440 | 0.01 |
| 470 | 0.01 |
| 510 | 0.01 |
| 560 | 0.01 |
| 615 | 0.005 |
| Ink #6 | |
| 255 | 0.04 |
| 300 | 0.02 |
| 350 | 0.02 |
| 395 | 0.015 |
| 445 | 0.015 |
| 475 | 0.015 |
| 510 | 0.015 |
| 565 | 0.01 |
| 615 | 0.005 |
| 750 | 0.005 |
| Ink #7 | |
| 260 | 0.03 |
| 305 | 0.01 |
| 345 | 0.01 |
| 385 | 0.005 |
| 425 | 0 |
| Ink #8 | |
| 260 | 0.07 |
| 300 | 0.03 |
| 355 | 0.02 |
| 400 | 0.01 |
| 440 | 0.005 |
| 475 | 0.005 |
| 520 | 0 |

Figure 6:
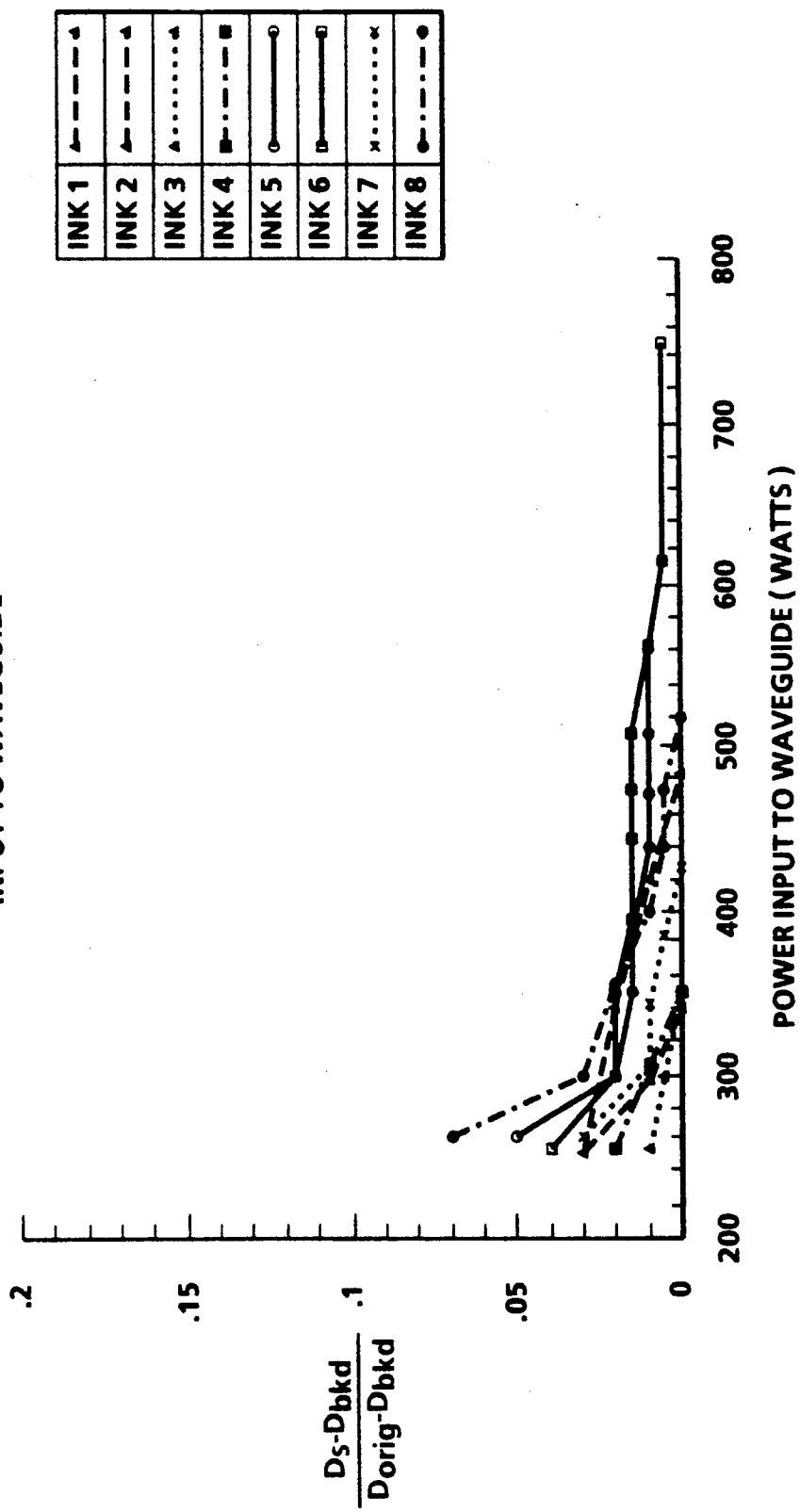
FIG. 6 represents a plot of the degree of offset of images generated on paper, comparing the offset of inks containing varying amounts of an ionic compound and dried by microwave radiation under varying power levels, as described in Example VI.

For the offset measurements at varying microwave power levels, the total time the printed sheet was exposed to the microwave dryer was 2.4 seconds. The offset results for varying levels of microwave power are illustrated by a plot of the data points as shown in FIG. 6, wherein the dashed line with solid triangular data points represents ink #1, the dashed line with hollow triangular data points represents ink #2, the dotted line with solid triangular data points represents ink #3, the dotted and dashed line with solid square data points represents ink #4, the solid line with hollow circular data points represents ink #5, the solid line with hollow square data points represents ink #6, the dotted line with "X" data points represents ink #7, and the dotted and dashed line with solid circular data points represents ink #8 As the data indicate, the inks with the higher conductivities require significantly less energy input to dry the solid areas, and the higher conductivity inks also required comparable or less microwave power to dry the text areas compared to inks of the same composition except for a lower ionic compound content and correspondingly lower conductivity. Comparing the results of Examples V and VI indicates that the inks in Example VI exhibited significantly less offset at a given microwave power level. This result is believed to be attributable to the greater degree of penetration of the inks into the paper in Example VI as a result of the different surfactant included in the ink.

EXAMPLE VII

The materials in the table below were prepared as 20 percent by weight solutions in deionized water. The temperature rise in the solutions was measured as a function of the microwave power as described in Examples II, III, and IV wherein the microwave power was applied at 300 watts. The large temperature increases seen as a function of microwave power applied, when compared to the deionized water control, demonstrate the microwave absorbance enhancing nature of the organic ionic materials.

| Additive | Conductivity (milli-Siemens/cm) | Temperature rise at 300 watts (°C.) |
| --- | --- | --- |
| Incromectant AQ, an acetamidopropyl trimonium chloride (Croda, Inc., New York, NY) 40 percent by weight solution in water | 47.8 | 58 |
| cetyl pyridinium chloride | 16.7 | 46 |
| Ceraphyl 60, a gluconamidopropyl dimethyl-2-hydroxyethyl ammonium chloride (Quaternium-22) (Van Dyk & Co., Belleville, NJ) 40 percent by weight solution in water | 37.2 | 53 |
| Daxad 19K, a polymeric naphthalene sulfonate (W. R. Grace, | 48.9 | 56 |

-continued

| Additive | Conductivity (milliSiemens/cm) | Temperature rise at 300 watts (°C.) |
| --- | --- | --- |
| Lexington, MA) sodium salt of formic acid | 110.6 | 47 |
| deionized water | <0.01 | 18 |

Other embodiments and modifications of the present invention may occur to those skilled in the art subsequent to a review of the information presented herein; these embodiments and modifications, as well as equivalents thereof, are also included within the scope of this invention.

What is claimed is:

1. A printing process which comprises applying in imagewise fashion to a substrate an ink composition which comprises an aqueous liquid vehicle, a colorant, and an ionic compound at least partially ionizable in the liquid vehicle, said ink composition having a conductivity of at least about 10 milliSiemens per centimeter, and subsequently exposing the substrate to microwave radiation, thereby drying the images on the substrate.

2. A process according to claim 1 wherein the liquid vehicle consists of water.

3. A process according to claim 1 wherein the liquid vehicle comprises water and a miscible organic component.

4. A process according to claim 3 wherein the miscible organic component is selected from the group consisting of ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and mixtures thereof.

5. A process according to claim 1 wherein the colorant is a dye.

6. A process according to claim 1 wherein the colorant is a pigment.

7. A process according to claim 1 wherein the ionic compound exhibits a degree of dissociation in the ink of 100 percent.

8. A process according to claim 1 wherein the ionic compound comprises a cation selected from the group consisting of $H+$, $Li+$, $Na+$, $K+$, $Mg^{2+}$, $Ca^{2+}$, $Fe^{2+}$, $Fe^{3+}$, $Al^{3+}$, $NH_4+$, and mixtures thereof and an anion selected from the group consisting of $OH-$, $F-$, $Cl-$, $Br-$, $I-$, $NO_3-$, $SO_4^{2-}$, $CH_3COO-$, and mixtures thereof.

9. A process according to claim 1 wherein the ionic compound is present in an amount of from about 0.25 to about 30 percent by weight of the ink.

10. A process according to claim 1 wherein the ionic compound is an inorganic compound present in an amount of from about 0.5 to about 25 percent by weight of the ink.

11. A process according to claim 1 wherein the ionic compound is an organic compound present in an amount of from about 0.5 to about 25 percent by weight of the ink.

12. A process according to claim 1 wherein the ink has a conductivity of at least about 12 milliSiemens per centimeter.

13. A process according to claim 1 wherein the ink has a conductivity of from about 20 to about 50 milliSiemens per centimeter.

14. A process according to claim 1 wherein the substrate bearing the printed images is exposed to microwave radiation at a power level of from about 100 to about 1,000 watts.

15. A process according to claim 1 wherein the substrate bearing the printed images is exposed to microwave radiation at a power level of from about 400 to about 1,000 watts.

16. A process according to claim 1 wherein the ink also contains a penetration enhancing agent.

17. A process according to claim 16 wherein the penetration enhancing agent is selected from the group consisting of polyethyleneimines derivatized with polyethylene oxide, polyethyleneimines derivatized with polypropylene oxide, N-methylpyrrolidinone, dimethylsulfoxide, butyl carbitol, cyclohexylpyrrolidinone, 1,2-hexanediol, and mixtures thereof.

18. A process according to claim 16 wherein the penetration enhancing agent is present in the ink in an amount of from about 0.0001 to about 10 percent by weight.

19. A process according to claim 16 wherein the penetration enhancing agent is present in the ink in an amount of from about 0.01 to about 4 percent by weight.

20. A printing process which comprises (1) incorporating into an ink jet printing apparatus an ink composition which comprises a liquid vehicle, a colorant, and an ionic compound at least partially ionizable in the liquid vehicle, said ink composition having a conductivity of at least about 10 milliSiemens per centimeter; (2) causing droplets of the ink to be ejected in an imagewise pattern onto a substrate, thereby generating images on the substrate; and (3) exposing the substrate to microwave radiation, thereby drying the images on the substrate.

21. A process according to claim 20 wherein the ink jet printing apparatus employs a continuous stream printing process.

22. A process according to claim 20 wherein the ink jet printing apparatus employs a drop-on-demand printing process.

23. A thermal ink jet printing process which comprises (1) incorporating into a thermal ink jet printing apparatus an ink composition which comprises an aqueous liquid vehicle, a colorant, and an ionic compound at least partially ionizable in the liquid vehicle, said ink composition having a conductivity of at least about 10 milliSiemens per centimeter; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

24. A process according to claim 23 wherein the colorant is a dye.

25. A process according to claim 23 wherein the colorant is a pigment.

26. A process according to claim 23 wherein the ionic compound exhibits a degree of dissociation in the ink of 100 percent.

27. A process according to claim 23 wherein the ionic compound comprises a cation selected from the group consisting of $H+$, $Li+$, $Na+$, $K+$, $Mg^{2+}$, $Ca^{2+}$, $Fe^{2+}$, $Fe^{3+}$, $Al^{3+}$, $NH_4^+$, and mixtures thereof and an anion selected from the group consisting of $OH^-$, $F^-$, $Cl^-$, $Br^-$, $I^-$, $NO_3^-$, $SO_4^{2-}$, $CH_3COO^-$, and mixtures thereof.

28. A process according to claim 23 wherein the ionic compound is present in an amount of from about 0.25 to about 30 percent by weight of the ink.

29. A process according to claim 23 wherein the ionic compound is an inorganic compound present in an amount of from about 0.5 to about 5 percent by weight of the ink.

30. A process according to claim 23 wherein the ionic compound is an organic compound present in an amount of from about 0.5 to about 25 percent by weight of the ink.

31. A process according to claim 23 wherein the ink has a conductivity of at least about 12 milliSiemens per centimeter.

32. A process according to claim 23 wherein the ink has a conductivity of from about 20 to about 50 milliSiemens per centimeter.

33. A process according to claim 23 wherein the substrate bearing the printed images is exposed to microwave radiation at a power level of from about 100 to about 1,000 watts.

34. A process according to claim 23 wherein the ink also contains a penetration enhancing agent.

35. A process according to claim 34 wherein the penetration enhancing agent is selected from the group consisting of polyethyleneimines derivatized with polyethylene oxide, polyethyleneimines derivatized with polypropylene oxide, N-methylpyrrolidinone, dimethylsulfoxide, butyl carbitol, cyclohexylpyrrolidinone, 1,2-hexanediol, and mixtures thereof.

36. A process according to claim 34 wherein the penetration enhancing agent is present in the ink in an amount of from about 0.0001 to about 10 percent by weight.

37. A process according to claim 34 wherein the penetration enhancing agent is present in the ink in an amount of from about 0.01 to about 4 percent by weight.

* * * * *